United States Patent
Sugihara

(10) Patent No.: US 7,349,622 B2
(45) Date of Patent: Mar. 25, 2008

(54) DATA RECORDING AND REPRODUCTION APPARATUS AND METHOD CAPABLE OF TIME SHIFT PLAYBACK

(75) Inventor: Akinobu Sugihara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 790 days.

(21) Appl. No.: 10/807,609

(22) Filed: Mar. 24, 2004

(65) Prior Publication Data
US 2004/0190858 A1    Sep. 30, 2004

(30) Foreign Application Priority Data
Mar. 26, 2003    (JP)    ............... 2003-084369

(51) Int. Cl.
*H04N 7/00* (2006.01)
*H04N 5/00* (2006.01)

(52) U.S. Cl. .......................... 386/46; 386/125
(58) Field of Classification Search ................ 386/83, 386/46, 92, 68, 1, 125, 124
See application file for complete search history.

(56) References Cited

FOREIGN PATENT DOCUMENTS

| JP | 2000-82279 | 3/2000 |
|---|---|---|
| JP | 2001-93264 | 4/2001 |
| JP | 2001-283528 | 10/2001 |
| JP | 2002-51302 | 2/2002 |
| JP | 2002-108662 | 4/2002 |
| JP | 2002-142177 | 5/2002 |
| JP | 2002-170319 | 6/2002 |
| JP | 2002-304803 | 10/2002 |
| JP | 2003-16731 | 1/2003 |

OTHER PUBLICATIONS

English translation of Japanese Office Action for Japanese patent application No.: 2003-084369, dated Feb. 14, 2006, 4 pages.
Japanese Office Action for Japanese patent application No.: 2003-084369, mailed Feb. 14, 2006, 3 pages.
Patent Abstracts of Japan, Publication No.: 2002-142177, Publication Date: May 17, 2002, 1 page.
Patent Abstracts of Japan, Publication No.: 2000-082279, Publication Date: Mar. 21, 2000, 1 page.
Patent Abstracts of Japan, Publication No.: 2003-016731, Publication Date: Jan. 17, 2003, 1 page.
Patent Abstracts of Japan, Publication No.: 2002-108662, Publication Date: Apr. 12, 2002, 1 page.

(Continued)

*Primary Examiner*—Robert Chevalier
(74) *Attorney, Agent, or Firm*—Osha Liang LLP

(57) ABSTRACT

In a time shift playback operation a read position and a write position are located in a time shift region and when a user changes the time shift reproduction operation to a recording operation the time shift region has a read position associated sector through a write position associated sector having their respective attributes altered into a recording region and in response a recording region has a partial region having an attribute altered into a time shift region. A region having an attribute altered from a recording region into a time shift region has the same size as a region having an attribute altered from a time shift region into a recording region.

10 Claims, 2 Drawing Sheets

OTHER PUBLICATIONS

Patent Abstracts of Japan, Publication No.: 2001-283528, Publication Date: Oct. 12, 2001, 1 page.
Patent Abstracts of Japan, Publication No.: 2002-304803, Publication Date: Oct. 18, 2002, 1 page.
Patent Abstracts of Japan, Publication No.: 2001-093264, Publication Date: Apr. 6, 2001, 1 page.
Patent Abstracts of Japan, Publication No. 2002-051302, Publication Date: Feb. 15, 2002, 1 page.
Patent Abstracts of Japan, Publication No. 2002-170319 dated Jun. 14, 2002, 1 pg.

DATA RECORDING AND REPRODUCTION APPARATUS AND METHOD CAPABLE OF TIME SHIFT PLAYBACK

BACKGROUND OF THE INVENTION

1. Field of the Invention

The present invention relates generally to apparatuses and methods that record and reproduce data, and in particular to such apparatuses and methods that receive, and record and/or reproduce program data including video data and/or audio data and include a temporary storage region in the form of a ring buffer to temporarily record the program data and a long term storage region recording data for a long period of time, and furthermore are capable of time shift playback to record program data to the temporary storage region and simultaneously reproduce the data.

2. Description of the Background Art

Conventionally a variety of technology has been disclosed for data recording and reproducing apparatuses capable of time shift playback as described above.

For example Japanese Patent Laying-Open No. 2002-170319 discloses that in time shift playback, overwriting a portion to be reproduced in a storage and reproduction apparatus is prevented. More specifically, when a current location in a ring buffer that is reproduced precedes a location that records and a current recording rate is faster than the location reproduced, the reproduction rate is compulsorily accelerated.

In time shift playback employing such a temporary storage region as described above when a user for example performs an operation to switch an operation of a data recording and reproduction apparatus to recording employing a long term storage region a point to record data needs to be changed from the temporary storage region to the long term storage region. This requires cumbersome control as the regions are separately provided in the apparatus, and conventionally there has been a need for simplifying such cumbersome control.

SUMMARY OF THE INVENTION

The present invention has been made to address such issue and contemplates a data recording and reproduction apparatus and method capable of simplifying a specific control effected to change an operation from time shift playback employing a temporary storage region to recording employing a long term storage region.

The present invention provides a data recording and reproduction apparatus receiving, and recording and/or reproducing program data including video data and/or audio data. The present apparatus includes: an input portion receiving an instruction input by a user; a recording portion recording program data; a reproduction portion reproducing program data recorded in the recording portion; a region management portion managing the recording portion by dividing the recording portion into a temporary storage region provided in a form of a ring buffer to temporarily record the program data, and a long term storage region recording the program data for a long period of time; and a control portion causing the recording portion and the reproduction portion to at least perform time shift playback to record program data to the temporary storage region and simultaneously reproduce the program data, and when the recording portion and the reproduction portion are performing the time shift playback and the input portion has received an instruction to record program data for a long period of time the region management portion effects management to alter the temporary storage region at a region containing a portion having the program data being reproduced through a portion recording the program data into the long term storage region.

In the present apparatus the region management portion preferably effects management to alter the long term storage region into the temporary storage region by a region having a size equal to a portion of the temporary storage region having been altered into the long term storage region.

In the present apparatus when the region management portion is to effect management to alter the long term storage region into the temporary storage region and the temporary storage region has a portion altered into the long term storage region the region management portion preferably preferentially alters the temporary storage region at the portion having been altered into the long term storage region into the temporary storage region.

In the present apparatus when the region management portion alters the long term storage region into the temporary storage region more than once the region management portion preferably alters into the temporary storage region a region of the long term storage region adjacent to a region having been altered into the temporary storage region.

In the present apparatus the region management portion preferably effects an exchanging process to alter the long term storage region having been altered into the temporary storage region back into the long term storage region, and alter the temporary storage region having been altered into the long term storage region back into the long term storage region.

In the present apparatus the region management portion is preferably driven by information input to the input portion to determine in size a region managed in the storage portion as the temporary storage region.

The present invention provides a method of recording and reproducing data, performed in a data recording and reproduction apparatus to receive, and record and/or reproduce program data including video data and/or audio data. The method includes the steps of: receiving an instruction input by a user; recording program data; reproducing the program data recorded; managing a region recording the program data by dividing the region into a temporary storage region provided in a form of a ring buffer to temporarily store the program data and a long term storage region storing the program data for a long period of time; effecting time shift playback to record program data to the temporary storage region and simultaneously reproduce the program data; and when the time shift playback is being effected and an instruction has been received to record the program data for a long period of time, effecting management to alter the temporary storage region at a portion having the program data being reproduced through a portion recording the program data into the long term storage region.

In the present method the step of effecting management preferably effects management to alter the long term storage region into the temporary storage region by a region having a size equal to a portion of the temporary storage region having been altered into the long term storage region.

In the present method in effecting management to alter the long term storage region into the temporary storage region when the temporary storage region has a portion altered into the long term storage region the portion of the temporary storage region having been altered into the long term storage region is preferably preferentially altered into the temporary storage region.

In the present method when the long term storage region is to be altered into the temporary storage region more than once a region of the long term storage region adjacent to a region having been altered into the temporary storage region is preferably altered into the temporary storage region.

The present method preferably further includes the step of altering the long term storage region having been altered into the temporary storage region back into the long term storage region, and the temporary storage region having been altered into the long term storage region back into the long term storage region.

The present method is preferably driven by information input by a user to determine in size a region managed as the temporary storage region.

In accordance with the present invention when a data recording and reproduction apparatus changes an operation from time shift playback employing a temporary storage region to recording employing a long term storage region a region in the temporary storage region that contains the current reproduction point through the current recording point can be altered into a long term storage region to eliminate the necessity of significantly changing a recording point. The apparatus allows an operation to be changed with simplified specific control from the time shift playback employing the temporary storage region to recording employing the long term storage region.

Furthermore in accordance with the present invention the long term storage region can be altered into a temporary storage region by a region of the same size as a portion of temporary storage region that has been altered into a long term storage region. A temporary storage region of a constant size can be maintained.

Furthermore in accordance with the present invention when a long term storage region is to be altered into a temporary storage region a portion that is originally a temporary storage region and has been altered into a long term storage region can preferentially be altered into a temporary storage region to minimize a disturbance in distribution between temporary and long term storage regions that is attributed to altering a region, as described in the present invention.

Furthermore in accordance with the present invention when a long term storage region is to be altered into a temporary storage region the temporary storage region can be formed in the long term storage region at adjacent regions. Time shift playback can be effected without a cumbersome operation changing a recording and reproduction point.

Furthermore in accordance with the present invention an exchanging process can be performed to minimize a disturbance in distribution between temporary and long term storage regions that is attributed to altering a region, as described in the present invention.

Furthermore in accordance with the present invention the temporary storage region can be sized as desired by the user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in one embodiment will be described with reference to the drawings more specifically.

Figure 1:
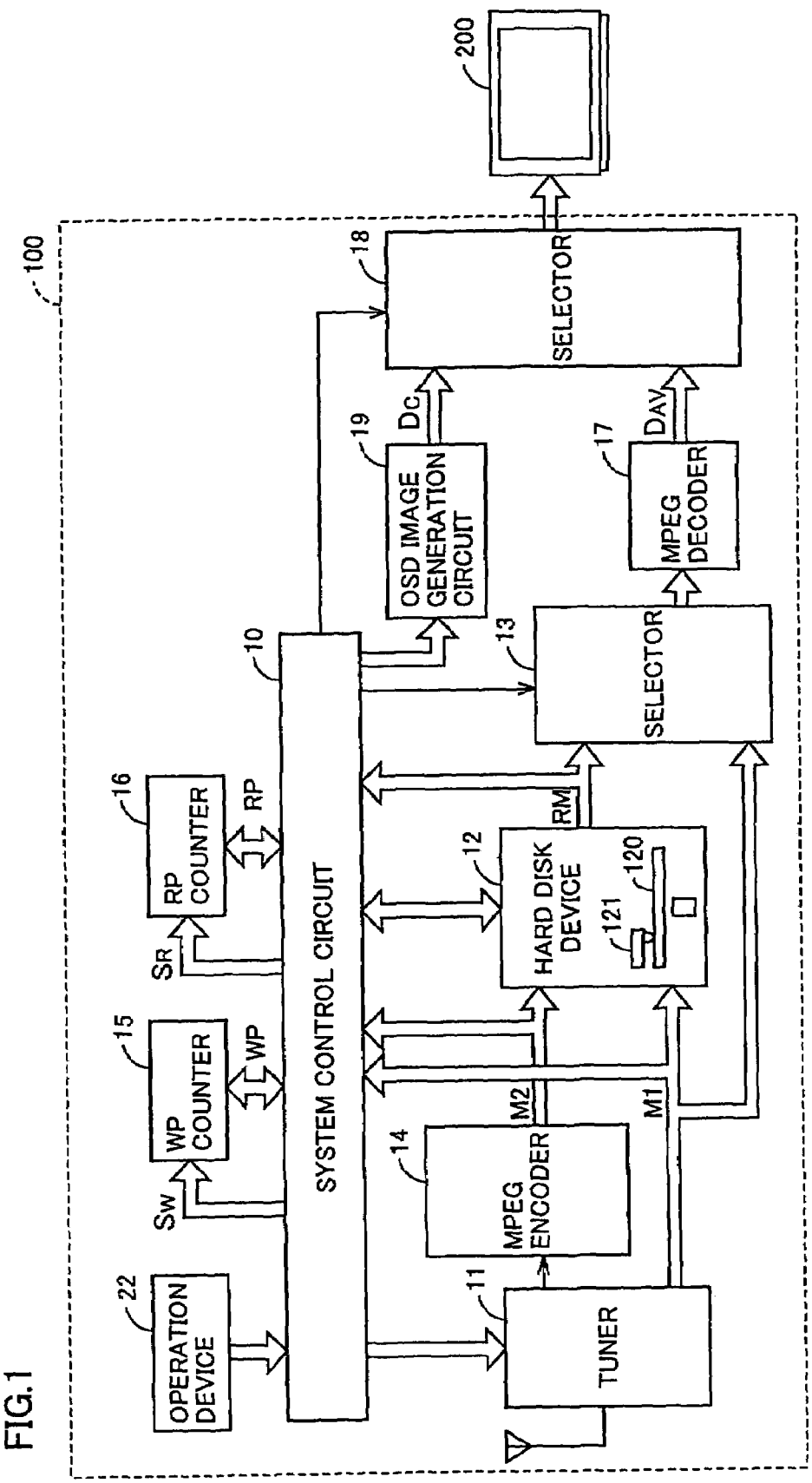
FIG. 1 shows a configuration of an information recording and reproduction apparatus as an example of the present data recording and reproduction apparatus.

With reference to FIG. 1, when a tuner 11 receives from a system control circuit 10 a signal designating a channel of a digital broadcast, tuner 11 receives the designated channel's digital broadcast wave. Tuner 11 demodulates the received digital broadcast wave to obtain a Moving Picture Experts Group (MPEG) signal and provide the signal as an MPEG signal M1 to a hard disk device 12 and a selector 13. Furthermore when tuner 11 receives from system control circuit 10 a channel designation signal of the National Television Standards Committee (NTSC) system, the Phase Alternation by Line (PAL) system, or the Sequential Couleur A Memoire (SECAM) system, tuner 11 receives the designated channel's analog television broadcast wave. Tuner 11 demodulates the received analog television broadcast wave to obtain a television signal and provide the signal to an MPEG encoder 14. MPEG encoder 14 subjects the television signal to an MPEG coding process to obtain a signal which is in turn provided as an MPEG signal M2 to hard disk device 12.

Figure 2:
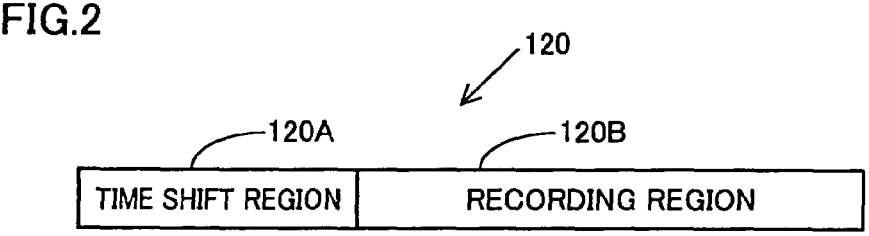
FIG. 2 schematically shows a memory area of a hard disk of FIG. 1 specifically.

With reference to FIG. 2, a hard disk 120 includes a time shift region 120A in the form of a ring buffer and a recording region 120B recording information for a long period of time. In hard disk 120 time shift region 120A and recording region 120B have their respective sizes determined for example by information input by a user through an operation device 22. In hard disk 120 time shift region 120A and recording region 120B have their respective locations managed by recording their respective addresses to system control circuit 10 at a memory (not shown).

When an information recording and reproduction apparatus 100 performs time shift playback the hard disk device 12 recording and reproduction head 121 responds to a recording instruction signal received from system control circuit 10 by recording MPEG signal M1 or M2 to hard disk 120 at time shift region 120A.

More specifically, system control circuit 10 issues an instruction to a write position counter (indicated in FIG. 1 as "WP counter") 15 to start a count operation and provides a current count value to hard disk device 12 as a write position WP to designate a recording location in time shift region 120A. Furthermore, system control circuit 10 provides write position counter 15 with a recording rate signal $S_W$ designating a recording rate corresponding to a bit rate of MPEG signal M1 or M2 to be recorded. Thus write position counter 15 performs a counting up operation at a rate corresponding to recording rate signal $S_W$.

In other words, in time shift playback, recording and reproduction head 121 allows MPEG signal M1 or M2 carrying a broadcast program received by tuner 11 to be recorded to time shift region 120A at a location indicated by write position WP. As write position WP varies at a rate corresponding to recording rate signal Sw, head 121 will record MPEG signal M1 or M2 to time shift region 120A at a recording rate indicated at recording rate signal $S_W$.

Furthermore, in time shift playback, head 121 operates in response to a reproduction instruction signal provided from system control circuit 10 to read a signal recorded in time shift region 120A and provides the read signal as a reproduction MPEG signal RM to a selector 13. System control circuit 10 issues an instruction to a read position counter (indicated in FIG. 1 as "RP counter") 16 to start a count operation, and provides a current count value to hard disk device 12 as a read position RP to designate a reading location in time shift region 120A.

Furthermore system control circuit 10 generates a reproduction rate signal $S_R$ to designate a reproduction rate corresponding to a bit rate of reproduction MPEG signal RM reproduced from time shift region 120A and provides reproduction rate signal $S_R$ to read position counter 16. Thus read position counter 16 performs a counting up operation at a rate corresponding to reproduction rate signal $S_R$.

In other words, recording and reproduction head 121 reads information recorded in time shift region 120A at a location indicated by read position RP to obtain reproduction MPEG signal RM. As read position RP varies at a rate corresponding to reproduction rate signal $S_R$, head 121 will read a recorded signal from time shift region 120A sequentially at a reproduction rate indicated by reproduction rate signal $S_R$.

Selector 13 selects one of reproduction MPEG signal RM provided from hard disk device 12 and MPEG signal M1 provided from tuner 11 that corresponds to a select signal provided from system control circuit 10, and selector 13 provides the selected signal to MPEG decoder 17. MPEG decoder 17 subjects the received MPEG signal to an MPEG decoding process to obtain a video signal and provides the signal as a video signal $D_{AV}$ to selector 18.

An on screen display (OSD) image generation circuit 19 generates a message image signal $D_C$ to display an image corresponding to a variety of message display instructions provided from system control circuit 10, and provides message image signal $D_C$ to selector 18. Selector 18 selects one of video signal $D_{AV}$ and message image signal $D_C$ that corresponds to a select signal provided from system control circuit 10, and provides the selected signal to a display device 200.

Display device 200 displays an image based on video signal $D_{AV}$ or message image signal $D_C$ provided from information recording and reproduction apparatus 100.

Operation device 22 accepts operations performed by a user for example to designate a channel of a broadcast, designate a recorded program, issue an instruction for recording, issue an instruction for reproduction, stop recording, and stop reproduction, and provides to system control circuit 10 a variety of operation signals corresponding to the operations. Note that operation device 22 may be a remote controller separated from the casing of information recording and reproduction apparatus 100.

In response to the variety of operations performed by a user using operation device 22, system control circuit 10 can cause information recording and reproduction apparatus 100 to effect TV-monitoring, recording, and time shift playback.

TV monitoring is an operation performed to view a currently broadcast program in real time. More specifically, a user uses operation device 22 to perform an operation to designate a desired broadcast's channel. In response to this operation, system control circuit 10 provides to tuner 11 a channel designation signal to receive a program of the desired broadcast's channel. Simultaneously, system control circuit 10 outputs a select signal to selector 13 to allow MPEG signal M1 output from tuner 11 to be selectively guided to MPEG decoder 17. Furthermore, system control circuit 10 outputs a select signal to selector 18 to allow audio signal $D_{AV}$ output from MPEG decoder 17 to be selectively guided to display device 200.

By such control, MPEG signal M1 received and demodulated by tuner 11 is provided via selector 13 to MPEG decoder 17. MPEG decoder 17 decodes the received signal to obtain audio signal $D_{AV}$ which is in turn provided via selector 18 to display device 200. Thus display device 200 displays in an image in real time a digitally broadcast program of a desired channel received at tuner 11.

A recording operation is, as has been described previously, an operation performed to record a program received at tuner 11. More specifically, a user uses operation device 22 to perform an operation to issue an instruction to record a program. In response to this operation, system control circuit 10 outputs a signal to hard disk device 12 to issue a recording instruction, an also takes in a current count value of write position counter 15 and provides the value as write position WP to hard disk device 12. Furthermore, system control circuit 10 obtains recording rate signal $S_W$ corresponding to a bit rate of MPEG signal M1 or M2 obtained, received at tuner 11, and stores signal $S_W$ to an incorporated register (not shown), and also provides it to write position counter 15. Thus hard disk device 12 records MPEG signal M1 or M2 to time shift region 120A at a location indicated by write position WP, sequentially at a rate corresponding to recording rate signal $S_W$.

A time shift playback operation is an operation performed to provide so-called time shift playback. More specifically, it performs such a recording operation as described above and simultaneously reproduces a recorded program. To do so, a user uses operation device 22 to effect an operation to issue an instruction for reproduction and an operation designating a recorded program.

Figure 3:
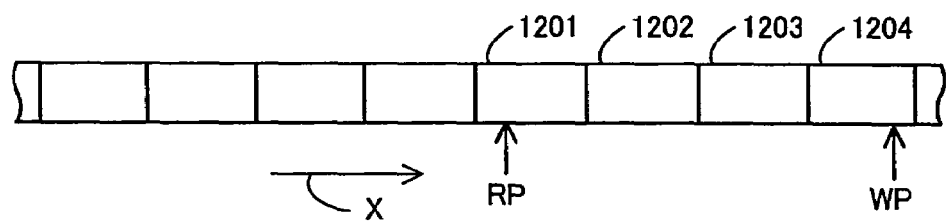
FIG. 3 schematically shows RP, WP in a time shift region when the FIG. 1 apparatus performs a time shift playback operation.

With reference to FIG. 3, when the time shift reproduction operation is performed, time shift region 120A has read position RP and write position WP, as will be described hereinafter.

Time shift region 120A is formed of a plurality of sectors. As shown in FIG. 3, time shift region 120A has a portion formed of eight sectors. Furthermore in FIG. 3 time shift region 120A has read position RP and write position WP moving in a direction X as time elapses. As shown in FIG. 3, in the time shift playback operation read and write positions RP and WP are located in sectors 1201 and 1204, respectively.

When information recording and reproduction apparatus 100 has such a condition as described above and a user shifts from the time shift playback operation to the recording operation system control circuit 10 performs a process to allow sector 1201 containing read position RP through sector 1204 containing write position WP, i.e. four sectors 1201-1204 to function as a recording region as the sectors are located in time shift region 120A. More specifically, system control circuit 10 alters from a time shift region into a recording region an attribute stored in a memory (not shown) internal to system control circuit 10 that is associated with an address corresponding to four sectors 1201-1204. Note that a sector is one example of a minimum unit in apparatus 100 to which system control circuit 10 can for example assign an attribute.

As an attribute is altered as described above, the region in time shift region 120A that in effect functions as a time shift region is now smaller in size than a region designated by the user as a time shift region. Accordingly system control circuit 10 alters from a recording region into a time shift region an attribute stored in a memory (not shown) internal to system control circuit 10 that is associated with a region located in recording region 120B and having the same size as four sectors 1201-1204.

Figure 4:
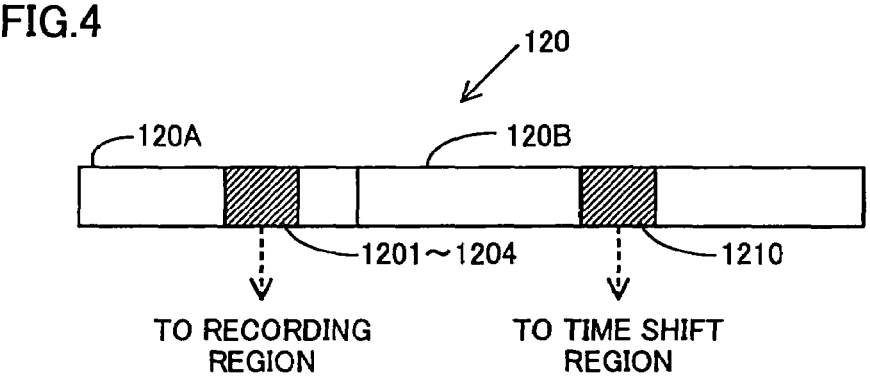
FIG. 4 is a view for illustrating an alteration in an attribute in the FIG. 1 apparatus at a time shift region's four sectors and a recording region's partial region.

In other words, with reference to FIG. 4, system control circuit 10 alters an attribute of four sectors 1201-1204 of time shift region 120A into a recording region and also alters an attribute of region 1210 of recording region 120B into a time shift region. Region 1210 has a size equal to sectors 1201-1204 added together.

Note that if recording region 120B has an attribute to be altered more than once, recording region 120B preferably has the attribute altered at a region adjacent to a region having its attribute previously altered. More specifically, with reference to FIG. 5, if recording region 120B has a region 1211 having an attribute altered into a time shift region, a region 1212 adjacent to region 1211 is preferably a region to have its attribute subsequently altered. Furthermore, if regions 1211 and 1212 have their attributes altered into a time shift region, a region 1213 adjacent to region 1212 is preferably a region to have its attribute subsequently altered.

Figure 5:
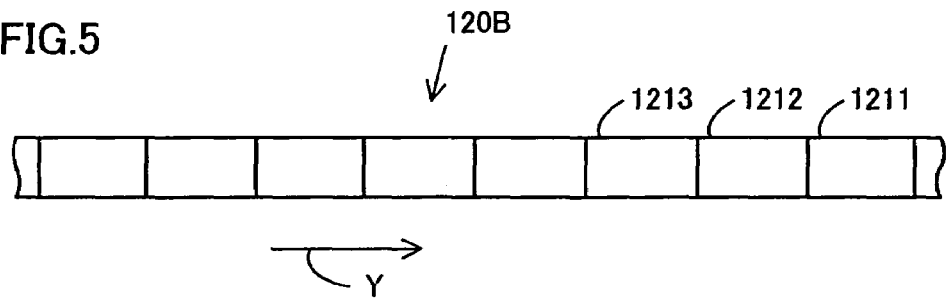
FIG. 5 is a view for illustrating a preferred manner in altering an attribute in the FIG. 1 apparatus at the recording region.

Furthermore with reference to FIG. 5 an arrow Y indicates a direction followed in recording region 120B by WP as time elapses. In recording region 120B, as shown in FIG. 5, a region subjected to recording as late as possible (a region to which information is written) preferably has its attribute altered into a time shift region.

Note that an attribute altered in time shift region 120A and recording region 120B, as described above, can be recovered by an operation performed by a user for example to request fragmentation. It should be noted, however, that such an operation to recover an attribute is preferably prohibited while system control circuit 10 is performing a recording operation, since a recording operation is performed while a user positively desires to record information, and for such a period it is preferable that the possibility of trouble in information recording and reproduction apparatus 100 be minimized.

Furthermore if time shift region 120A and recording region 120B as described above have an attribute altered and a user performs an operation to reduce time shift region 120A in size, a region of time shift region 120A having its attribute altered into recording region 120B is preferably altered into recording region 120B.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data recording and reproduction apparatus receiving, and recording and/or reproducing program data including video data and/or audio data, comprising:
    an input portion receiving an instruction input by a user;
    a recording portion recording program data;
    a reproduction portion reproducing program data recorded in said recording portion;
    a region management portion managing said recording portion by dividing said recording portion into a temporary storage region provided in a form of a ring buffer to temporarily record said program data, and a long term storage region recording said program data for a long period of time; and
    a control portion causing said recording portion and said reproduction portion to at least perform time shift playback to record program data to said temporary storage region and simultaneously reproduce the program data, when said recording portion and said reproduction portion are performing said time shift playback and said input portion has received an instruction to record program data for a long period of time said region management portion effecting management to alter said temporary storage region at a region containing a portion having said program data being reproduced through a portion recording said program data into said long term storage region;
    wherein when said region management portion alters said long term storage region into said temporary storage region more than once said region management portion alters into said temporary storage region a region of said long term storage region adjacent to a region having been altered into said temporary storage region.

2. The apparatus of claim 1, wherein said region management portion effects management to alter said long term storage region into said temporary storage region by a region having a size equal to a portion of said temporary storage region having been altered into said long term storage region.

3. The apparatus of claim 2, wherein in effecting management to alter said long term storage region into said temporary storage region when said temporary storage region has a portion altered into said long term storage region said region management portion preferentially alters the temporary storage region at the portion having been altered into said long term storage region into said temporary storage region.

4. The apparatus of claim 1, wherein said region management portion effects an exchanging process to alter said long term storage region having been altered into said temporary storage region back into said long term storage region, and alter said temporary storage region having been altered into said long term storage region back into said long term storage region.

5. The apparatus of claim 1, wherein said region management portion is driven by information input to said input portion to determine in size a region managed in said storage portion as said temporary storage region.

6. A method of recording and reproducing data, performed in a data recording and reproduction apparatus to receive, and record and/or reproduce program data including video data and/or audio data, comprising the steps of:
    receiving an instruction input by a user;
    recording program data;
    reproducing said program data recorded;
    managing a region recording said program data by dividing said region into a temporary storage region provided in a form of a ring buffer to temporarily store said program data and a long term storage region storing said program data for a long period of time;
    effecting time shift playback to record program data to said temporary storage region and simultaneously reproduce said program data; and
    when said time shift playback is being effected and an instruction has been received to record said program data for a long period of time, effecting management to alter said temporary storage region at a portion having said program data being reproduced through a portion recording said program data into said long term storage region;

wherein when said long term storage region is to be altered into said temporary storage region more than once a region of said long term storage region adjacent to a region having been altered into said temporary storage region is altered into said temporary storage region.

7. The method of claim 6, wherein the step of effecting management effects management to alter said long term storage region into said temporary storage region by a region having a size equal to a portion of said temporary storage region having been altered into said long term storage region.

8. The method of claim 7, wherein in effecting management to alter said long term storage region into said temporary storage region when said temporary storage region has a portion altered into said long term storage region the portion of the temporary storage region having been altered into said long term storage region is preferentially altered into said temporary storage region.

9. The method of claim 6, further comprising the step of altering said long term storage region having been altered into said temporary storage region back into said long term storage region, and said temporary storage region having been altered into said long term storage region back into said long term storage region.

10. The method of claim 6, driven by information input by a user to determine in size a region managed as said temporary storage region.

* * * * *